UNITED STATES PATENT OFFICE.

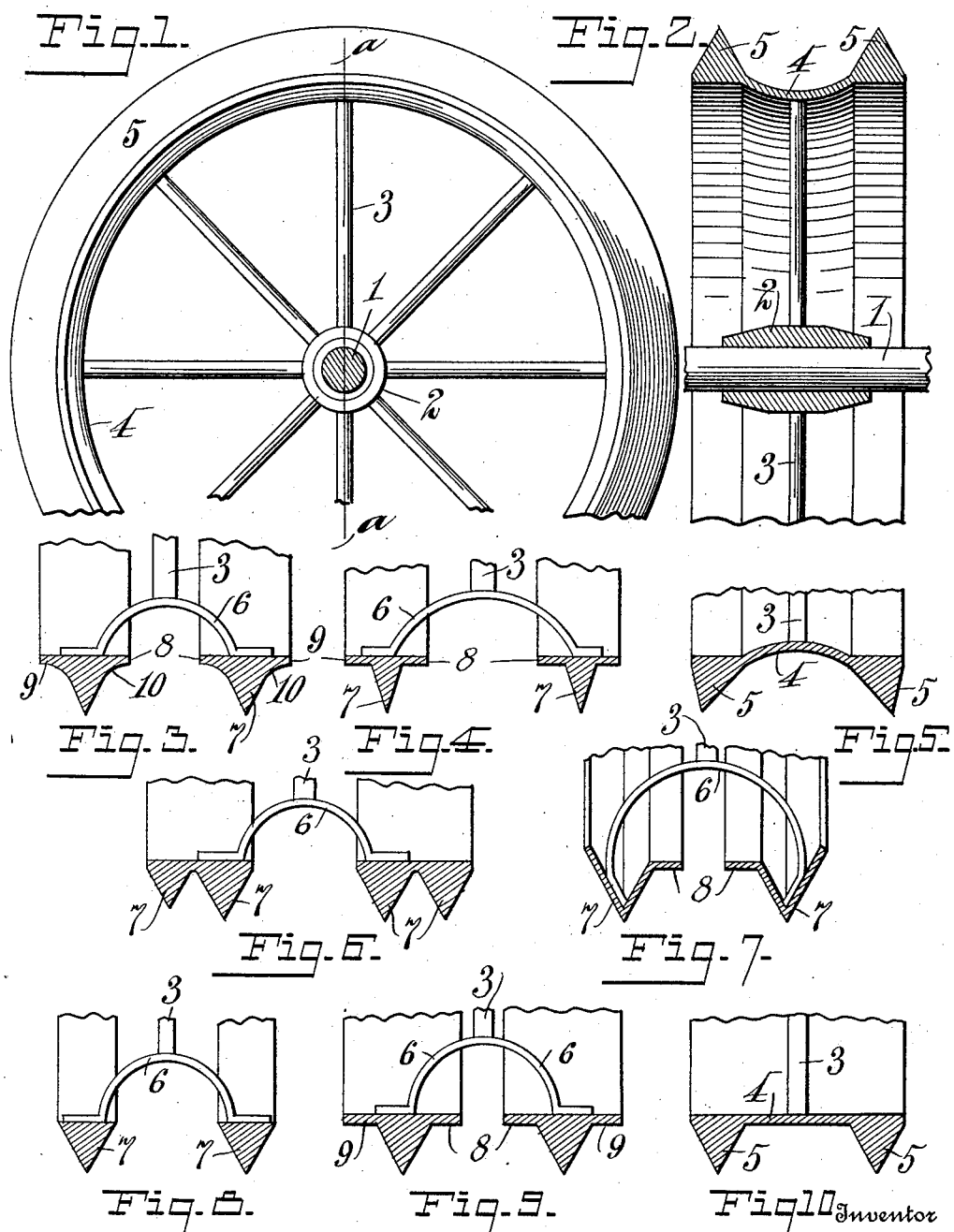

STEPHEN H. GARST, OF MOLINE, ILLINOIS.

CORN-PLANTER TRACTOR.

1,057,141.  Specification of Letters Patent.  Patented Mar. 25, 1913.

Application filed May 2, 1912. Serial No. 694,785.

*To all whom it may concern:*

Be it known that I, STEPHEN H. GARST, citizen of the United States, residing at Moline, in the county of Rock Island and State of Illinois, have invented certain new and useful Improvements in Corn-Planter Tractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tractors for corn planters.

As is well known, tractors for corn planters in addition to driving the mechanism and supporting the machine, cover the seed by closing the furrow left by the shoe of the planter.

The object of the invention is to provide a tractor, which in addition to its usual functions, so manipulates and molds the soil, whereby excessive moisture will be drained from the ridge, which prevents the seed rotting in cold weather.

Another object of the invention is to provide a tractor which manipulates the soil to form depressions along the ridge, thereby permitting the cultivator shovels to break the soil, when dry, without disturbing the soil around the seed.

Referring to the drawings, Figure 1 is a side elevation of a tractor as constructed according to my invention; Fig. 2 is a section on the line $a$—$a$ of Fig. 1; and Figs. 3 to 10, inclusive, are sectional views showing modified forms of the tractor rims.

Throughout the specification and drawings, similar reference characters indicate corresponding parts.

Referring more particularly to the drawings, 1 represents an axle to which is attached a hub 2 having spokes radiating therefrom. Tractors for corn planters are of two types, the closed or solid which is shown in Figs. 2, 5 and 10, and the open type shown in Figs. 3, 4, 6, 7, 8 and 9. The solid type is provided with an intermediate portion 4, which may be formed curved as in Fig. 2, or flat as is shown in Fig. 10, and which is attached to the outer ends of the spokes 3. The outer edge of the intermediate portions 4 are provided with wedge shaped rims 5 which are adapted to form impressions on each side of the ridge. The angles of the rims 5 may be equal as is shown in Figs. 2 and 10, or one side may be provided with a greater angle than the other as is shown in Fig. 5. In the open type of tractor, the outer ends of the spokes 3 are attached to yokes 6 the extremities of which are united to wedge shaped rims 7 similar to the rims 5. In Fig. 8, the rims 7 are shown in their simplest form, but in Figs. 3, 4 and 9, the rims 7 are provided with inner and outer flanges 8 and 9. In Fig. 3, the rims 7 are provided with fillets 10, while the faces of the rims 7 shown in Fig. 4, make a sharper angle than those shown in Figs. 3, 8 and 9. The rims 7 shown in Fig. 4, are adapted to be used in extremely hard and dry earth. In Fig. 7, the rims 7 are made of sheet metal and are provided with inner flanges 8 only. In Fig. 6, the rims 7 may be made duplex and one rim may be made smaller than the other as is shown at the left in said view.

From the above description, it will be seen that tractors for corn-planters when constructed in this manner are adapted to form depressions or grooves in the ground on each side of the ridge which contains the seed. The ridges expose more surface and will therefore warm up quicker as both sides and top are exposed to the sun and warm air. The corn will therefore germinate in less time. The various types of rims are adapted to the different kinds of soils, and the ridge may be packed on both sides and the top as desired. As much corn is planted in April, the weather is often unfavorable for germination, being both cold and wet, and it is well known that the seed will often rot in the ground under these conditions. Under these conditions, the grooves formed by the rims 5 and 7 will drain off the surplus water, thereby preventing the water standing over the grain. In dry times the grooves will catch and hold the water that would fall in a dashing rain until it has time to soak in the soil. These grooves remain in the soil only from the time the grain is planted until the first cultivation. When the first cultivation is made, the plant is small and quite delicate, hence is liable to be covered up by the dirt which rolls away from the cultivator shovel. The grooves play an important part at the first cultivation, by forming a check to the dirt as it rolls away from the cultivator and thereby preventing the soil covering the young plants. Should the surface of the soil become crusted after planting, as the result of a dashing rain or hot sun, the first cultivation ordinarily becomes a very laborious and difficult operation, for the reason that the surface crust will break up in large flakes with great damage to the growing grain. However, when the grooves are formed by the rims 5 and 7 on each side of the ridge, the crust of the soil will break at the angle of the grooves, thereby preventing the soil being disturbed around the young and tender plants.

Having described my invention, what I desire to claim and secure by Letters Patent is,—

1. In a device of the type specified, a tractor wheel provided with angular rims and adapted to form a ridge with grooves along the sides thereof.

2. In a device of the type specified, a tractor wheel provided with angular rims having flanges on both sides and adapted to form a ridge with grooves along the sides thereof.

3. In a device of the type specified, a tractor wheel provided with angular rims having flanges and fillets thereon and adapted to form a ridge with grooves along the sides thereof.

In testimony whereof I affix my signature, in presence of two witnesses.

STEPHEN H. GARST.

Witnesses:
HUBERT BURGIS,
SADIE GARST.